(12) United States Patent
Woolcock et al.

(10) Patent No.: US 11,377,205 B2
(45) Date of Patent: Jul. 5, 2022

(54) AIRCRAFT LANDING GEAR

(71) Applicant: Airbus Operations Limited, Bristol (GB)

(72) Inventors: John Woolcock, Bristol (GB); Nicholas Hancock, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 458 days.

(21) Appl. No.: 16/310,002

(22) PCT Filed: Jun. 9, 2017

(86) PCT No.: PCT/GB2017/051693
§ 371 (c)(1),
(2) Date: Dec. 14, 2018

(87) PCT Pub. No.: WO2017/216528
PCT Pub. Date: Dec. 21, 2017

(65) Prior Publication Data
US 2019/0135416 A1     May 9, 2019

(30) Foreign Application Priority Data

Jun. 16, 2016 (GB) .................................... 1610538

(51) Int. Cl.
*B64C 25/12*     (2006.01)
*B64C 25/04*     (2006.01)
(Continued)

(52) U.S. Cl.
CPC .............. *B64C 25/12* (2013.01); *B64C 25/04* (2013.01); *B64C 25/20* (2013.01); *B64C 25/34* (2013.01)

(58) Field of Classification Search
CPC ... B64C 25/10; B64C 25/12; B64C 2025/125; B64C 25/04; B64C 25/20
See application file for complete search history.

(56) References Cited

U.S. PATENT DOCUMENTS 2,668,030 A * 2/1954 Smith .................... B64C 25/26
244/102 SL
4,345,727 A * 8/1982 Brown .................... B64C 25/12
244/102 R
(Continued)

FOREIGN PATENT DOCUMENTS

EP     0 031 602     7/1981
EP     1784330     1/2008
(Continued)

OTHER PUBLICATIONS

Combined Search and Examination Report for Great Britain Application No. GB1610538.9, dated Nov. 29, 2016, five pages.
(Continued)

*Primary Examiner* — Philip J Bonzell
*Assistant Examiner* — Ashesh Dangol
(74) *Attorney, Agent, or Firm* — Nixon & Vanderhye P.C.

(57) ABSTRACT

A landing gear is disclosed having a main strut being connected to a first attachment point located on the aircraft. The landing gear includes an inboard sidestay and outboard sidestays. The inboard sidestay has a first end connected to the main strut for movement along the main strut and is connected at a second end to a second attachment point located on the aircraft. The outboard sidestay has a first end connected to the main strut for movement along the main strut and is connected at a second end to a third attachment point located on the aircraft. When the landing gear is in a deployed configuration, the connection between the first end of each of the inboard and outboard sidestays and the main strut allows for movement of each first end along at least a portion of the length of the main strut.

21 Claims, 5 Drawing Sheets

(51) Int. Cl.
B64C 25/20 (2006.01)
B64C 25/34 (2006.01)

(56) References Cited

U.S. PATENT DOCUMENTS

| | | | | |
|---|---|---|---|---|
| 4,392,623 A * | 7/1983 | Munsen | ............... | B64C 25/10 |
| | | | | 244/102 R |
| 6,651,931 B1 * | 11/2003 | Fox | ............... | B64C 25/12 |
| | | | | 244/104 R |
| 8,376,272 B2 * | 2/2013 | Bennett | ............... | B64C 25/22 |
| | | | | 244/102 SL |
| 2009/0057484 A1 | 3/2009 | White | | |

FOREIGN PATENT DOCUMENTS

| | | |
|---|---|---|
| FR | 793 094 | 1/1936 |
| GB | 510290 | 7/1939 |
| GB | 527191 | 10/1940 |
| GB | 632110 | 11/1949 |
| WO | 8202179 | 7/1982 |

OTHER PUBLICATIONS

International Search Report for PCT/GB2017/051693, dated Oct. 9, 2017, 2 pages.

* cited by examiner

AIRCRAFT LANDING GEAR

CROSS RELATED APPLICATIONS

The present application is a National Phase of International Application Number PCT/GB2017/051693, filed Jun. 9, 2017, which claims priority from Great Britain Application Number 1610538.9, filed Jun. 16, 2016, the entire contents of each of which are hereby incorporated by reference.

BACKGROUND OF THE INVENTION

The present disclosure relates to an improved landing gear for an aircraft. More particularly, but not exclusively, this invention is concerned with wing-mounted landing gear.

The primary loads experienced by a landing gear during normal operations are typically categorised as vertical loads, drag loads and lateral loads. Typically, vertical loads act along an axis parallel to the vertical axis of the aircraft and are generated by the action of gravity on the mass of the aircraft, in particular during landing. Drag loads act along an axis substantially parallel to the longitudinal axis of the aircraft and are generated by friction between the tyres and ground on 'spin up' of the wheels at touchdown and also when braking. Lateral loads act along an axis substantially parallel to the lateral axis of the aircraft and are generated during steering. The landing gear may also be subject to secondary loads such as torque loads and aerodynamic drag.

The wing structure of an aircraft having wing-mounted landing gear must have sufficient strength to react the landing gear loads at the point at which the landing gear attaches to the wing. This may limit the choice of materials that can be used to construct the wing and/or lead to the need for the structure to be reinforced thereby increasing the weight of the aircraft. This is a particular issue for wings using composite materials, for example Carbon Fibre Reinforced Polymer (CFRP) wings, as these materials are typically anisotropic. For example, CFRP materials can withstand higher loading along the fibre length, but may require substantial reinforcement to accommodate off-axis loads. It would therefore be desirable to provide a landing gear that results in an improved load profile, for example a reduction in the maximum load experienced at the point of attachment to the landing gear to the wing.

One prior art method of reducing the loads experienced at any one point of attachment is to provide a landing gear which transfers loads from the landing gear to the aircraft over multiple attachment points. However, many of those designs provide a very uneven load distribution across the multiple attachment points, with the majority of the load still being carried via one or two attachment points. Furthermore, many multipoint landing gear are arranged to transfer loads to one or more points on the fuselage of the aircraft in addition to, or instead or, attachment points on the wing. Reacting a portion of the load through the fuselage of the aircraft is not always desirable as it places additional design constraints on the aircraft.

The present invention seeks to mitigate one or more of the above-mentioned problems. Alternatively or additionally, the present invention seeks to provide an improved landing gear, and in particular a wing-mounted landing gear.

SUMMARY OF THE INVENTION

The present invention provides, according to a first aspect, an aircraft including a landing gear comprising a main strut, the main strut being connected to a first attachment point located on the aircraft; an inboard sidestay, the inboard sidestay having a first end connected to the main strut for movement along the main strut, the inboard sidestay being connected at a second end to a second attachment point located on the aircraft; and an outboard sidestay, the outboard sidestay having a first end connected to the main strut for movement along the main strut, the outboard sidestay being connected at a second end to a third attachment point located on the aircraft, and wherein, in use when the landing gear is in the deployed configuration, the connection between the first end of each of the inboard and outboard sidestays and the main strut allows for movement of each first end along at least a portion of the length of the main strut.

Thus, when the landing gear is in the deployed configuration neither of the first ends are fully constrained in terms of freedom-of-movement along the main strut. Landing gear in accordance with the present invention are multipoint landing gear in which the landing gear loads are distributed over three attachment points. Providing a three-point landing gear with an inboard sidestay and an outboard sidestay connected to the main strut such that the ends of the sidestays have at least some freedom of movement vertically relatively to the strut may provide a more equal distribution of landing gear loads over the three attachment points by facilitating control of the distribution of vertical landing gear loads as between the sidestays and main strut while allowing both sidestays and the main strut to transfer drag and lateral loads.

The landing gear may be configured to have three principal landing gear load paths via which landing gear loads are transferred to the aircraft; the inboard sidestay path, the outboard sidestay path and the main strut path. Each of the inboard sidestay, outboard sidestay and main strut may be configured to cause landing gear loads to be transferred from the landing gear to the aircraft via a point of attachment to the aircraft when the landing gear is deployed. The inboard sidestay may extend between the main strut and a point of attachment to the aircraft, for example an attachment point located on the spar of a wing. The outboard sidestay may extend between the main strut and a point of attachment to the aircraft, for example an attachment point located on the spar of a wing. The first end of each of the inboard and outboard sidestays may be connected (directly or indirectly) to the main strut such that the first end is located adjacent to the strut. The second end of each of the inboard and outboard sidestays may be connected (directly or indirectly) to the aircraft such that the second end is located adjacent to the wing. The proximal end of the main strut may be connected (directly or indirectly) to the aircraft such that the proximal end of the main strut is located adjacent to the wing.

It will be appreciated that when the landing gear is in the deployed configuration the configuration of the rest of the landing gear may be such there is little or no movement of a first end of a sidestay relative to the main strut. However, it will be appreciated that having a connection between the main strut and each first end which does not fully constrain the vertical movement of a first end may prevent the local (e.g. direct) transfer of vertical loads between the main strut and the first end, thereby at least partially isolating the sidestay from vertical loads.

The first end of a sidestay may be connected to the main strut (directly or indirectly) for movement along the main strut. That is to say, the connection between the first end and the main strut may permit the first end to move vertically relative to the main strut. The connection may be configured to allow for movement of a first end along at least a portion of the length of the main strut. For example, the connection may be configured to allow each first end to slide along a portion of the length of the main strut. The first end of each sidestay and the main strut may be connected such that the axial position of the first end relative to the main strut can vary while the radial position of the first end relative to the main strut remains substantially constant.

Each first end may be mounted for movement relative to the each part of the main strut. For example, where the main strut is an oleo strut, each first end may be mounted to move relative to both the cylinder and piston of the strut. Each first end may be mounted for movement along the portion of the main strut immediately adjacent to the first end.

The landing gear may comprise a load transmission system arranged to transfer drag loads from the main strut to the aircraft. The load transmission system may comprise the inboard sidestay and the outboard sidestay. The load transmission system may further comprise one or more connectors which connect a first end of each sidestay to the main strut such that the first end can move along at least a portion of the length of the main strut. The load transmission system may further comprise one or more dampers arranged to transfer at least a portion of the vertical landing gear loads experienced by the landing gear (for example by the main strut, trailing linkage (if present) and/or wheels of the landing gear) to the aircraft via the inboard and outboard sidestays. Alternatively, it may be that the load transmission system does not include such a damper in which case the inboard and outboard sidestays may be effectively isolated from vertical landing gear loads.

It may be that the movement of the first end of each of the inboard and outboard sidestays is not locally damped such that the sidestays are effectively isolated from vertical landing gear loads experienced by the main strut. Thus, it may be that the landing gear, for example the load transmission system, is arranged such that each of the inboard sidestay, outboard sidestay and main strut can transmit one or more components of the landing gear loads to the aircraft but the connection of each first end to the main strut prevents the transmission of vertical landing gear loads from the main strut to the inboard and outboard sidestays such that substantially all the vertical landing gear loads are transferred to the aircraft via the main strut. The first end of each of the inboard and outboard sidestays may be connected to the main strut for unconstrained vertical movement along at least a portion of the length of the main strut such that the sidestays are effectively isolated from vertical landing gear loads experienced by the main strut. Thus it may be that no external damper is connected to either of the first ends.

The landing gear may comprise one or more dampers configured such that at least a portion of the vertical landing gear loads are transmitted to each sidestay via a damper. It may be that the landing gear is arranged such that each of the inboard sidestay, outboard sidestay and main strut can transmit one or more components of the landing gear loads to the aircraft but a damper (for example a shock absorber) limits the transmission of vertical landing gear loads to the inboard and outboard sidestays. Providing a landing gear where the load transmission system includes a damping element may enable further control of the distribution of landing loads between the three landing gear load paths. The landing gear may comprise two dampers; a first damper connected to the first end of the inboard sidestay and a second damper connected to the first end of the outboard sidestay. The landing gear may comprise a damper connected to each of the inboard sidestay and outboard sidestay such that a single damper regulates the movement of the first ends relative to the main strut. A damper may be connected (directly or indirectly) at a first end to the inboard sidestay, the outboard sidestay or both sidestays. A damper may be connected at a second end to the landing gear, for example to the main strut, an axle (if present), the bogie (if present), trailing linkage (if present) or the wheels of the landing gear. The damper may comprise a shock absorber. The damper may comprise an oleo strut. The landing gear may comprise a single damper arranged to regulate the movement of both first ends. The at least one damper may be arranged to oppose the movement of a first end along the main strut.

The landing gear may comprise a collar mounted on the main strut for axial movement along the main strut. The collar may be free to slide along the main strut. The first end of each of the inboard and outboard sidestays may be mounted on a collar, for example the same collar. Thus, the connection between the first end of each of the inboard and outboard sidestays may comprise a collar. Freedom of movement of the first end of a sidestay may therefore be provided by mounting the first end on a slidable collar. Mounting the first end of each sidestay on a collar may prevent any substantial component of the vertical landing gear loads being transferred from the main leg to the sidestay, thereby effectively isolating the sidestay from the vertical landing gear loads.

The collar may comprise a body (for example a tubular or annular body) concentrically mounted on the main strut. The collar may extend around at least a portion of, for example the whole of, the circumference of the main strut. The collar may be mounted to slide along the main strut. The inboard and outboard sidestays may be attached to opposite points on the outer circumference of the collar. The point at which the inboard and outboard sidestays are attached to the collar may be spaced apart by approximately 180 degrees around the circumference of the collar. The first end of each of the inboard and/or outboard sidestays may be pivotally attached to the collar. The first end of each of the inboard and/or outboard sidestays may be pivotally attached to the collar for movement about a single axis, said axis being substantially parallel to the longitudinal axis of the landing gear. The length of the collar may be very much less than the length of the main strut. The length of the collar may be less than 50 percent, for example less that 25 percent or less than 10 percent, of the length of the strut. The length of the collar may be less than or similar to the diameter of the collar.

In the case that the inboard and/or outboard sidestays are connected to the landing gear via a collar, a damper may be connected to the first end of the or each sidestay via the collar. For example, where both the inboard and outboard sidestays are connected to the same collar, a single damper may be connected to both sidestays via the collar. The damper may be connected to the collar such that the first end of the damper is located adjacent to the collar. The damper may be pivotally attached to the collar at a first end.

The landing gear may comprise a conventional trailing linkage. The trailing linkage may be connected at a first end to the main strut, for example to the distal end of the main strut. The trailing linkage may be connected at a second end to the wheels of the landing gear. The trailing linkage may be connected to the wheels of the landing gear via attachment to an axle or bogie.

In the case that the landing gear comprises a trailing linkage, the damper may be connected to the inboard and/or outboard sidestays at a first end of the damper and to the trailing linkage at a second end of the damper. The damper may be configured to transfer at least a portion of the vertical landing gear loads experienced by the trailing linkage to the aircraft via the inboard and/or outboard sidestays. The damper may be pivotally connected to the collar at a first end and to the trailing linkage at a second end. It may be that the damper, for example the shock absorber, is arranged to maintain the trailing linkage in the deployed configuration (i.e. for landing and taxiing).

In a further aspect of the invention there may be provided a method of designing a landing gear in accordance with any other aspect, the method comprising altering the load distribution in the landing gear by varying the angle at which the damper is inclined relative to the main strut while the landing gear is in the deployed configuration. The step of altering the load distribution may be carried out as part of the design process. The damper may be configured to damp motion along a main axis. The method of design may comprise varying the angle of the main axis of the damper relative to the longitudinal axis of the main strut. The step of varying the angle of inclination of the damper relative to the main strut may comprise varying the position at which the damper connects to the trailing linkage.

The method may comprise identifying a landing gear load distribution suitable for reaction by the aircraft structure (the design load distribution). The method may comprise calculating the landing gear load distribution (the first load distribution) for a landing gear comprising at least one damper connected at a first angle of inclination to the main strut (for example connected at a first location to the trailing linkage). The method may comprise comparing the first load distribution to the design load distribution. In the event that the first load distribution exceeds the design load distribution the method may comprise calculating the landing gear load distribution (a second load distribution) for a landing gear comprising at least one damper connected at a second, different, angle of inclination (for example connected at a second location along the length of the trailing linkage). The method may comprise comparing the second load distribution with the design load distribution. In the event that the second load distribution exceeds the design load distribution the method may comprise calculating the landing gear load distribution (a further load distribution) for a further angle of inclination (for example a further location along the length of the trailing linkage). The method may comprise varying the angle of inclination and/or the point of connection between the trailing linkage and the damper and repeating the calculation of the load distribution until an angle/position (the design angle/position) that provides a load distribution that does not exceed the design distribution is identified. The method may comprise manufacturing a landing gear according to any other aspect including a damper having the design angle/position while in the deployed configuration. The method may comprise attaching the landing gear to the aircraft.

It will be understood that in order for a component of load to be transferred from the landing gear to the aircraft structure via a given attachment point, the movement of the landing gear element connected to that attachment point must be constrained in at least one direction when the landing gear is deployed.

The landing gear may be arranged such that, in use, when the landing gear is in the deployed configuration, drag loads are transferred by the inboard and outboard sidestays for reaction at the second and third attachment points respectively. Thus, the landing gear may be arranged such that, in use, when the landing gear is deployed, rotation of the inboard and outboard sidestays relative to the relevant attachment point (i.e. the attachment point to which the element in question is connected) about an axis substantially parallel to the lateral axis of the aircraft is prevented. The landing gear may be arranged such that drag loads are not reacted at the first attachment point. Alternatively, the landing gear may be arranged such that at least some of the drag loads can be transferred by the main strut for reaction at the first attachment point. The landing gear may be arranged such that drag loads are reacted at all three attachment points.

The landing gear may be arranged such that, in use, when the landing gear is the deployed configuration, lateral loads are transferred through the inboard and outboard sidestays for reaction at the second and third attachment points respectively. Thus, the landing gear may be arranged such that, in use, when the landing gear is deployed, rotation of the inboard and outboard sidestays relative to the relevant attachment point about an axis substantially parallel to the longitudinal axis of the aircraft is prevented. The landing gear may be arranged such that lateral loads are not reacted at the first attachment point. Alternatively, the landing gear may be arranged such that at least some of the lateral loads can be transferred by the main strut for reaction at the first attachment point.

The inboard and outboard sidestays may extend diagonally upward and outward in a spanwise direction from their point of attachment to the main strut. The inboard and outboard sidestays may extend in a plane substantially perpendicular to the longitudinal axis of the aircraft. The inboard an outboard sidestays may together form a v-shaped frame. The main strut may extend along the centreline of the v-shaped frame. The lateral loads may be reacted by both the inboard and outboard sidestays in accordance with the principle of a triangular frame. Depending on the connection between the main strut and the first attachment point, the main strut may also transmit a component of the lateral load for reaction at the first attachment point.

The landing gear may be arranged such that, in use, torque loads are transferred to the aircraft via the inboard and outboard sidestays. The landing gear may be arranged such that, in use, substantially no torque loads are transferred to the aircraft via the main strut. Providing a landing gear in which the main strut does not transmit torque loads to the aircraft may further improve the load distribution as between the first, second and third attachment points by forcing different types of load to be reacted at different attachment points.

The landing gear may comprise a torque link. The torque link may be connected at a first end to the main strut and at a second end to the collar such that, in use, when the landing gear is in the deployed configuration, torque loads experienced by the main strut are transferred to the aircraft via the collar and the inboard and outboard sidestays. Thus, torque loads may be transferred via the torque link and collar to the inboard and outboard sidestays for reaction and the second and third attachment points. The main strut may be connected to the first attachment point such that torque loads cannot be transferred from the main strut to the first attachment point. For example, the connection between the main strut and the first attachment point may permit rotation of the main strut relative to the vertical axis of the aircraft.

The landing gear may comprise an axle. The landing gear may comprise one or more wheels attached to the axle. The landing gear may comprise a bogie. The landing gear may comprise one or more wheels attached to the bogie via an axle in the conventional manner. The landing gear may comprise a second torque link connected at a first end to the bogie or an axle and at a second end to the main strut such that torque loads from the bogie or axle can be transferred to the main strut.

The first, second and third attachment points may be arranged in the same vertical plane. The first, second and third attachment points are arranged in a straight line. Arranging the attachment points in this manner may facilitate the design of an efficient retraction process.

It may be that the aircraft includes a wing and the first, second and third attachment points are located on a structure forming part of the wing. Thus, the landing gear may be a wing-mounted landing gear. Providing a wing-mounted landing gear may facilitate the incorporation of the landing gear in accordance with the present invention into existing aircraft designs. It may be that substantially all the landing gear loads are transferred to the fuselage of the aircraft via the wing.

The wing may comprise at least one spar. The first, second and third attachment points may be located on a spar, for example the same spar. Mounting a landing gear to a wing spar, which is already sized to withstand significant loads, may reduce the need for additional reinforcement and therefore provide a weight saving over other prior art designs. The spar may be the rear spar of the main wing box.

The wing may be made, at least in part, from composite materials. The spar may be made, at least in part from composite materials. Composite materials may include metal or polymer composites, for example metal matrix composites, hybrid composites or fibre-reinforce polymers such as Carbon Fibre Reinforced Polymer (CFRP).

The main strut may be an oleo strut. The oleo strut may comprise a cylinder, and a piston mounted for movement within the cylinder. The first end of each of the inboard and outboard sidestays may be free to move vertically relative to both the piston and the cylinder. The first end of each of the inboard and outboard sidestay may be connected for axial movement relative to the cylinder and/or the piston. The collar may be mounted for axial movement along the cylinder.

Each attachment point may comprise a mounting feature. Each of the main strut, the inboard sidestay and/or the outboard sidestay may comprise a mounting feature corresponding to the mounting feature on the relevant attachment point. The mounting feature of an attachment point may correspond to the mounting feature of an element of the landing gear (e.g. the main strut, an inboard sidestay and/or an outboard sidestay) such that said element can be connected to the aircraft via the attachment point. The main strut, inboard sidestay and/or outboard sidestay may be connected to the relevant attachment point using a planar bearing. The main strut may be connected to the first attachment point using a spherical bearing.

The landing gear may be a retractable landing gear. The landing gear may be attached to the aircraft via the first, second and third attachment points for rotation between a deployed configuration and a retracted configuration. The inboard sidestay may be pivotally connected to the second attachment point for rotation about an axis substantially parallel to the longitudinal axis of the aircraft during retraction and/or deployment of the landing gear. The inboard sidestay may be pivotally connected to the second attachment point for rotation about a single axis during retraction and/or deployment. The outboard sidestay may be pivotally connected to the third attachment point for rotation about an axis substantially parallel to the longitudinal axis of the aircraft during retraction and/or deployment of the landing gear. The outboard sidestay may be pivotally connected to the third attachment point for rotation about a single axis during retraction and/or deployment of the landing gear. The main strut may be pivotally connected to the first attachment point for rotation about an axis substantially parallel to the longitudinal axis of the aircraft during retraction and/or deployment of the landing gear. The main strut may be connected to the first attachment point for rotation about a central point in two orthogonal axes during retraction and/or deployment of the landing gear. The first axis may be substantially parallel to the longitudinal axis of the aircraft. The second axis may be substantially parallel to the vertical axis of the aircraft.

The inboard sidestay may be of variable length. Providing an inboard sidestay of variable length may facilitate compact storage of the landing gear and/or an efficient retraction kinematic. The landing gear may be configured such that the inboard sidestay is locked in an extended configuration when the landing gear is deployed. The landing gear may be configured such that the inboard sidestay is in a retracted configuration when the landing gear is retracted.

It may be that the inboard sidestay is configured to fold. The inboard sidestay may comprise an upper sidestay member and a lower sidestay member pivotally connected to each other at a joint located between the first end and the second end of the inboard sidestay. The upper sidestay member may be connected at a first end to the third attachment point and pivotally connected at a second end to the lower sidestay member. The lower sidestay member may be pivotally connected at a first end to the second end of the upper sidestay member and connected at a second end to the main strut. It may be that the inboard sidestay is locked in a straight configuration when the landing gear is in the deployed configuration. It may be that the inboard sidestay is in a folded configuration when the landing gear is retracted.

It may be that the inboard sidestay is a telescopic sidestay. Thus, the inboard sidestay may comprise two or more sections configured to slide into one another as the landing gear retracts.

The outboard sidestay may be of a fixed length. It may be that the outboard sidestay comprises a single member connected at a first end to the main strut and at a second end to the third attachment point.

The landing gear may be a main landing gear. The aircraft may comprise a nose landing gear and more than one main landing gear, for example two or more main landing gear. Thus, an aircraft may comprise more than one landing gear in accordance with the present invention.

The aircraft may be a commercial aircraft, for example a commercial passenger aircraft, for example a single aisle or twin aisle aircraft. The aircraft may be suitable for carrying more than 50 passengers, for example more than 100 passengers.

In accordance with a second aspect of the invention, there is provided a method of distributing landing gear loads in an aircraft including a landing gear comprising a main strut, the main strut being connected to a first attachment point located on the aircraft; an inboard sidestay, the inboard sidestay having a first end connected to the main strut, the inboard sidestay being connected at a second end to a second attachment point located on the aircraft; and an outboard sidestay, the outboard sidestay having a first end connected to the main strut, the outboard sidestay being connected at a second end to a third attachment point located on the aircraft, wherein, in use when the landing gear is in the deployed configuration, the connection of the first end of each of the inboard and outboard sidestays allows for movement of the first end along the main strut. Providing a landing gear in which the first ends are not fixed in the vertical degree of freedom relative to the main strut may facilitate the design of a landing gear having a particular load distribution by allowing for variation in the degree to which vertical landing gear loads are transferred from the main strut to the sidestays.

In accordance with a third aspect of the invention, there is provided a method of distributing landing gear loads in an aircraft including a landing gear comprising a main strut, an inboard sidestay, and an outboard sidestay, and wherein in use, each of the main strut, inboard sidestay and outboard sidestay provides a separate landing gear load path via which landing gear loads are transferred to the aircraft and wherein the transfer of vertical landing gear loads to the aircraft via the inboard and outboard sidestays is limited by allowing one end of each of the inboard and outboard sidestays freedom to move vertically relative to the main strut.

In accordance with a fourth aspect of the invention, there is provided an aircraft landing gear comprising a main strut, an inboard sidestay, and an outboard sidestay, wherein the landing gear is configured such that, in use, when the landing gear is deployed each of the main strut, inboard sidestay and outboard sidestay provides a separate landing gear load path via which landing gear loads are transferred to the aircraft and wherein one end of each of the inboard and outboard sidestays is connected to the main strut for movement along the main strut when the landing gear is deployed so as to limit the transfer of vertical landing gear loads to the aircraft via the inboard and outboard sidestays.

It may be that each landing gear load path causes landing gear loads to be transferred to the aircraft. Each landing gear load path may cause landing gear loads to be transferred to the aircraft via a different attachment point. Each landing gear load path may represent the shortest route between two points. The main strut load path may be defined as the shortest route between the main strut and the first attachment point. The inboard sidestay load path may be defined as the shortest route between the first end of the inboard sidestay and the second attachment point. The outboard sidestay load path may be defined as the shortest route between the first end of the outboard sidestay and the third attachment point.

The landing gear may further comprise at least one damper. The at least one damper may provide at least one load path via which vertical landing gear loads are transferred from the landing gear to the inboard sidestay and the outboard sidestay. The load path provided by the at least one damper may be the shortest route between the first end of a sidestay and the landing gear, for example the main strut or trailing linkage. It will be appreciated that the level of damping of the first ends may determine the magnitude of the load experienced by the first ends in response to a given load case. It may be that the landing gear does not include a damper arranged to regulate the movement of the first ends. In that case, it may be that the first ends of the inboard and outboard sidestays are free to move relative to the main strut such that the inboard and outboard sidestays are effectively isolated from vertical landing gear loads experienced by the main strut.

In accordance with a fifth aspect of the invention there is provided a landing gear configured for use as the landing gear of any other aspect.

In accordance with a sixth aspect of the invention there is provided a method of retracting an aircraft landing gear comprising a main strut, the main strut being connected to a first attachment point located on an aircraft; an inboard sidestay, the inboard sidestay being connected at a first end to the main strut and at a second end to a second attachment point located on the aircraft and an outboard sidestay, the outboard sidestay being connected at a first end to the main strut and at a second end to a third attachment point located on the aircraft, the method comprising the steps of rotating the main strut about an axis substantially parallel to the longitudinal axis of the aircraft; and wherein the first end of each of the inboard and outboard sidestays slides up the main strut as the strut rotates.

Each sidestay may be connected to the main strut via a collar. It may be that the collar slides up the main strut as the strut rotates. As the landing gear moves between the deployed configuration and the retracted configuration the first end of a sidestay (e.g. the inboard and/or outboard sidestay) may move along the length of the main strut. As the landing gear moves from the deployed configuration towards the retracted configuration the first end of the inboard and/or outboard sidestay may move from a first position along the length of the main strut to a second, different position along the length of the main strut. The first axial position may be closer to the distal end of the landing gear (e.g. the end of the landing gear to which the wheels are attached) than the second axial position. That is to say, each first end may move up the main strut as the landing gear retracts. Similarly, each first end may move down the main strut as the landing gear deploys. In the case that the landing gear comprises a collar, the collar may move up the main strut from a first axial position to a second axial position during the retraction process. The collar may move down the main strut from the second axial position to the first axial position during the deployment process.

It may be that aerodynamic drag and torque loads are transferred to the aircraft via the inboard sidestay and outboard sidestay while the landing gear is retracting.

As the landing gear moves from the deployed configuration towards the retracted configuration, the length of the sidestay may reduce. For example, the inboard sidestay may move from a straight configuration to a folded configuration. Thus, the inboard sidestay may fold during the retraction process.

As the landing gear moves from the deployed configuration towards the retracted configuration, the outboard sidestay may rotate about an axis lying substantially parallel to the longitudinal axis of the aircraft. The length of the outboard sidestay may remain constant during the retraction process.

As the landing gear moves from the deployed configuration towards the retracted configuration, the trailing linkage (if present) may rotate about the distal end of the landing gear such that the wheels move upwards such that the length of the landing gear is reduced.

The landing gear may be arranged for sideways retraction. That is to say the landing gear may be arranged for retraction by rotation about an axis substantially parallel to the longitudinal axis of the aircraft.

The landing gear may comprise an actuator, for example a linear actuator. The linear actuator may be connected to the main strut such that movement of the actuator causes inboard rotation of the landing gear. The actuator may be arranged to cause inboard rotation of the landing gear about an axis that is substantially parallel to the longitudinal axis of the aircraft.

The actuator may be arranged to move the landing gear between a deployed configuration and a retracted configuration. In the retracted configuration the landing gear may be located within the envelope of the aircraft, for example completely contained in a recess formed in the aircraft, for example in the wing and/or fuselage of the aircraft. Thus, when the landing gear is retracted the landing gear may be out of the main air-flow caused by the forward motion of the plane. In the deployed (or extended) configuration the landing gear may be arranged to support the aircraft, for example during take-off, landing and/or taxiing. In the deployed configuration the landing gear may be arranged to transfer lateral, drag and/or vertical landing gear loads to the aircraft.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
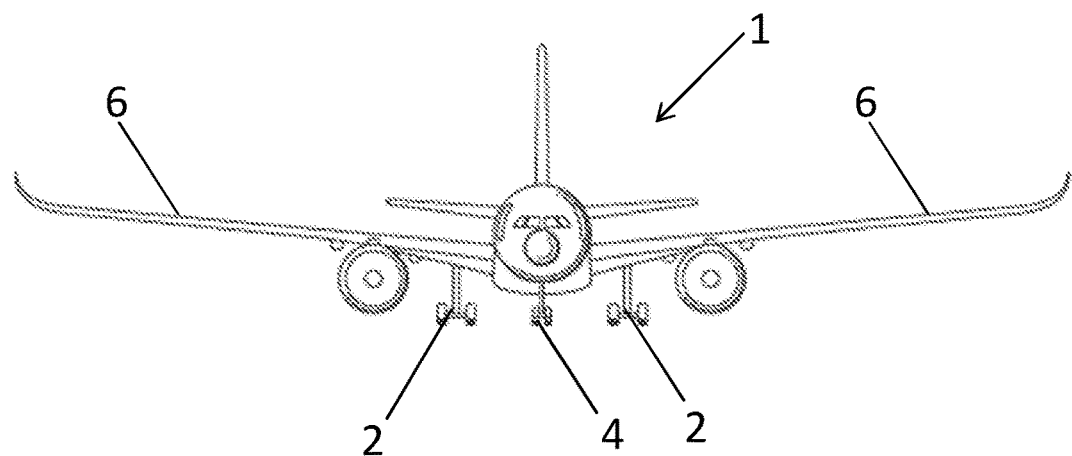
FIG. 1 shows a schematic view of an aircraft including a landing gear according to a first embodiment of the invention.
Figure 2:
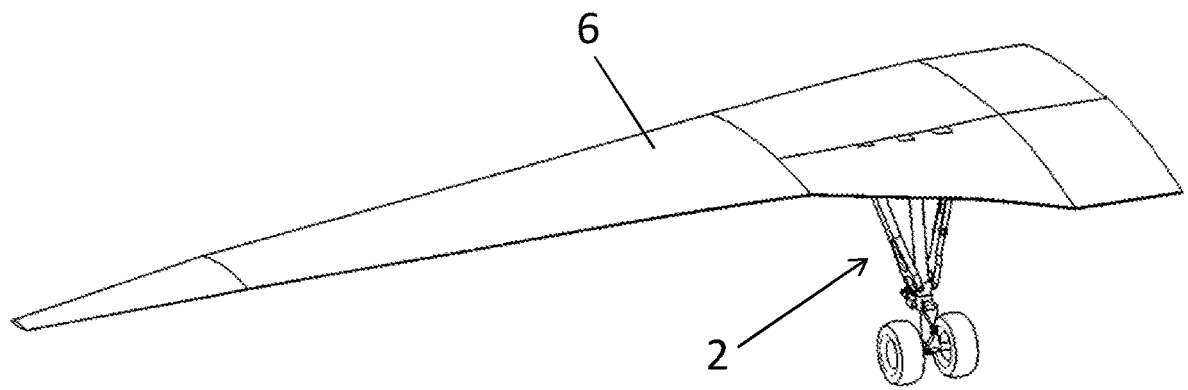
FIG. 2 shows a wing including a landing gear in accordance with the first example embodiment.

FIG. 1 shows an aircraft 1 including a main landing gear 2 in accordance with a first example embodiment of the invention. The aircraft 1 includes a nose landing gear 4, located at the centre line of the aircraft, and two main landing gear 2, one main landing gear being mounted on each wing 6. FIG. 2 shows a perspective view of a portion of a wing 6 including a landing gear 2 in accordance with the first example embodiment. In FIG. 2 the landing gear 2 is in a deployed configuration.

Figure 3:
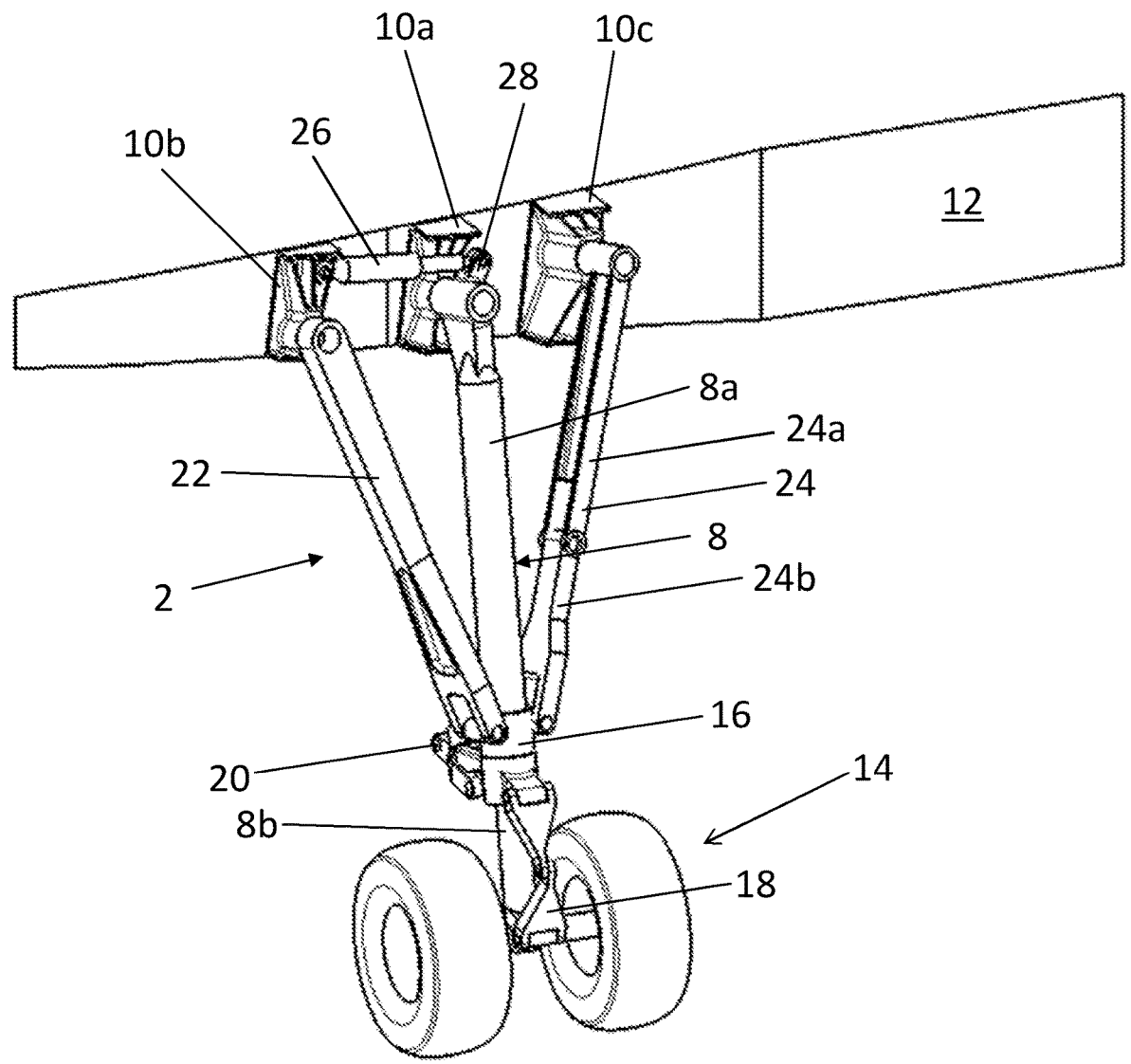
FIG. 3 shows a perspective view of the landing gear of the first embodiment.

FIG. 3 shows a close-up of the landing gear of FIG. 2 and a portion of the rear spar 12 of the wing 6 of FIG. 2. The landing gear 2 comprises an oleo strut 8, comprising a housing 8a and a piston 8b. The housing 8a is connected at its upper end to a central attachment point 10a, the central attachment point 10a being fixed to the rear spar 12 of the wing 6. A two-wheel axle 14 is connected to the lower end of the piston 8b. A cylindrical collar 16 is mounted on the housing 8a of the strut 8. A lower torque link 18 is pivotally connected at its lower end to the axle 14 and at its upper end to the strut 8, at the housing 8a. An upper torque link 20 is connected at its lower end to the strut 8, at the housing 8a and at its upper end to the collar 16. An outboard sidestay 22 is pivotally connected at its lower end to the collar 16. The upper end of the outboard sidestay 22 is pivotally connected to an outboard attachment point 10b. The outboard attachment point 10b is mounted on the spar 12 at a position outboard of the central attachment point 10a. The outboard sidestay 22 comprises a single member extending diagonally between the collar 16 and attachment point 10b. An inboard sidestay 24 is pivotally connected at its lower end to the collar 16. The upper end of the inboard sidestay 24 is pivotally connected to an inboard attachment point 10c. The inboard attachment point 10c is mounted on the spar 12 inboard of the central attachment point 10a and outboard attachment point 10b. The inboard sidestay 24 is hinged and comprises an upper member 24a and a lower member 24b. The upper member 24a is pivotally connected at its upper end to the inboard attachment point 10c, and at its lower end to the upper end of the lower member 24b. The lower member 24b is pivotally connected at its upper end to the lower end of the upper member 24a, and at its lower end to the collar 16. In the deployed position as shown in FIGS. 1 to 3, the inboard sidestay 24 is straight and extends diagonally upwards and away from the strut 8 to the inboard attachment point 10c. A linear actuator 26 is connected to a radially extending lug 28 on the upper end of the strut 8.

Each of the attachment points 10a, 10b, 10c comprises a bearing (not shown in FIG. 1) which enables the upper end of the relevant sidestay 22, 24 or main strut 8 to rotate relative to the attachment point 10 about an axis that is substantially parallel to the longitudinal axis of the aircraft during retraction and/or deployment of the landing gear but prevents rotation about any other axis. In use, when the landing gear is in the deployed position the landing gear is locked such that none of the sidestays 22, 24 or main strut 8 can rotate about that axis. Means of achieving such locking are well known to the skilled person and will not be discussed further here.

In use, when the landing gear is locked in the deployed position as shown in FIGS. 1 to 3, vertical loads experienced by the landing gear 2 are transferred along the main strut 8 but cannot be transferred from the main strut 8 to the inboard 24 or outboard 22 sidestays because the collar 16 to which the sidestays 22, 24 are connected is free to move vertically relative to the main strut 8, thereby effectively isolating the inboard 24 and outboard 22 sidestays from the vertical loading. The main strut 8, inboard 24 and outboard 22 sidestay are constrained from rotating about an axis substantially parallel to the lateral axis of the aircraft such that the drag loads experienced by the landing gear will be transferred via all three of the main strut 8, inboard sidestay 24 and outboard sidestay 22 to the attachment points 10a, 10b, 10c. The major element of the lateral loads will be reacted by the inboard sidestay 24 and outboard sidestay 22, as a result of their triangular/v-shaped configuration, with an element of the lateral loads also being transferred via the main strut 8. The upper torque link 20 will act to transfer torque load from the main strut 8 to the sidestays 22, 24 via collar 16 for reaction at the outboard 10b and inboard 10c attachment points. Thus, landing gear in accordance with the present embodiment may distribute different components of the landing gear loads (e.g. drag loads, torque loads and vertical loads) to different attachment points on the aircraft, thereby reducing the maximum load experienced at the attachment points and reducing and/or eliminating the need for structural reinforcement at the attachment points.

In other embodiments the central attachment point 10a may comprise a spherical bearing, which permits rotation of the main strut 8 about a central point in two orthogonal directions; around axes lying parallel to the longitudinal axis and the vertical axis of the aircraft 1, while otherwise preventing movement of the strut 8. In those embodiments torque loads cannot be transferred to the aircraft 1 via the first attachment point 10a due to the lack of constraint in the relevant direction. Instead the torque and drag loads are transferred to the aircraft 1 via the inboard 24 and outboard 22 sidestays only.

Figure 4A:
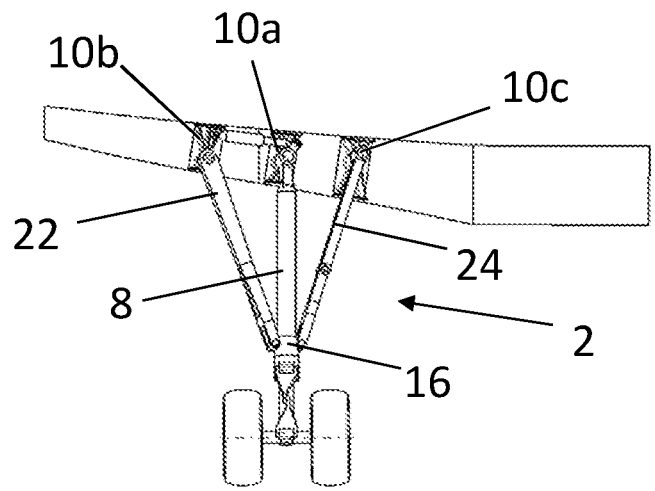
FIG. 4 shows a perspective view of the landing gear of the first embodiment in (a) the deployed position, (b) an intermediate position and (c) the retracted position.
Figure 4B:
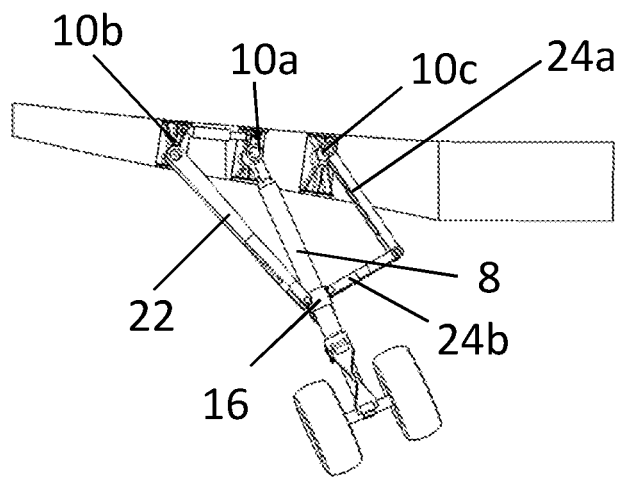
Figure 4C:
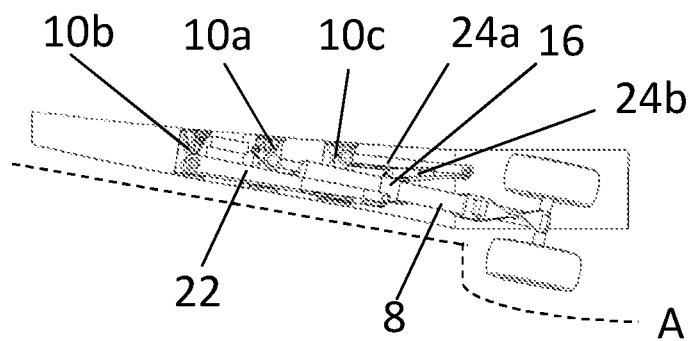

FIGS. 4 (*a*), (*b*) and (*c*) show a front view of the landing gear of the first embodiment at various stages of the retraction process. In the fully deployed position of FIG. 4(*a*) the inboard 24 and outboard 22 sidestays each extend diagonally upwards and away from the collar forming a 'v' shape, with the strut 8 between them. The upper member 24(*a*) and lower member 24(*b*) of the inboard sidestay 24 are in line, such that the inboard sidestay 24 appears straight when viewed from the front in FIG. 4(*a*). In FIG. 4(*b*), the landing gear 2 is in an intermediate configuration, part way between the deployed and retracted configuration. The distal end of the landing gear 2 is located further inboard and the collar 16, to which the sidestays 22, 24 remain attached, is located high up the strut 8, further towards the underside of the wing 6, in comparison to FIG. 4(*a*). The outboard sidestay 22 has rotated inboard relative to the outboard attachment point 10*b*; the lower end of the outboard sidestay 22 is located inboard of the central attachment point 10*a* and the angle between the outboard sidestay 22 and the main strut 8 is reduced in comparison to the deployed position. The inboard sidestay 24 is partially folded in FIG. 4(*b*); the point at which the upper 24*a* and lower 24*b* members meet is now located inboard of attachment point 10*c* and the lower member 24*a* lies perpendicular to the strut 8. The outline of the underside of the wing and fuselage is denoted by a dashed line in FIG. 4(*c*). In FIG. 4(*c*) the landing gear is in the fully retracted position with the landing gear located within the envelope of the wing 4 and fuselage 5 of the aircraft 1. In the fully retracted position of FIG. 4(*c*) the collar 16 has moved even further up the strut 8 and the outboard sidestay 22 lies alongside part of, and almost parallel to, the strut 8. The inboard sidestay 24 is folded with the lower member 24*a* lying at an acute angle to the upper member 24*b*.

Figure 5:
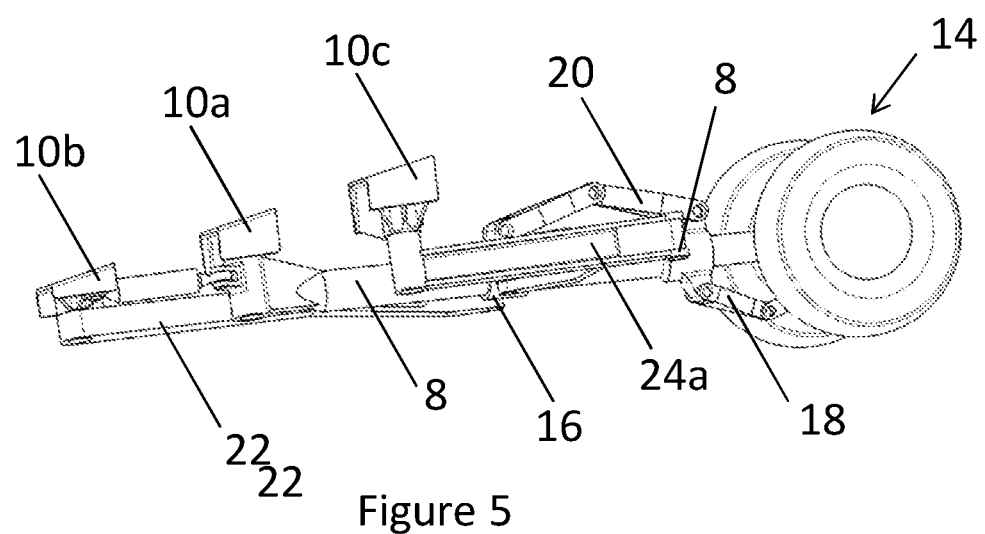
FIG. 5 shows a plan view of a landing gear in accordance with the first embodiment in the retracted position.

In use, to retract the landing gear 2 the linear actuator 26 exerts a force on the radial lug 28 (see FIG. 3) to rotate the strut 8 on central attachment point 10*a* around an axis running substantially parallel to the longitudinal axis of the aircraft. The wheels of the landing gear 2 are consequently moved inboard and towards the centreline of the aircraft 1 until the landing gear 2 reaches the intermediate position shown in FIG. 4(*b*). The inward rotation of the strut 8 causes the single-piece outboard strut 22 to also rotate inwards, with the collar 16 sliding up the strut 8. The ends of the sidestays 22, 24 pivot about the point at which they are attached to the collar 16. As the collar 16 slides up the inboard strut begins to fold, and continues to do so until the landing gear reaches the configuration shown in FIG. 4(*b*). The continued rotation of the landing gear causes the collar to slide further up the strut 8, with the angle between the strut 8 and outboard stay 22 decreasing while the inboard strut continues to fold. As the collar 16 moves up the strut 8 the upper torque link 20 extends to accommodate that movement (see FIG. 5 which shows a top down view of the landing gear in the retracted position). Thus, embodiments in accordance with the present invention may allow for the retraction of the landing gear in a space efficient manner. Moreover, during the retraction process the incidental drag and torque loads are reacted via the inboard 24 and outboard 22 sidestays, thereby helping to control the locus of retraction.

Figure 6:
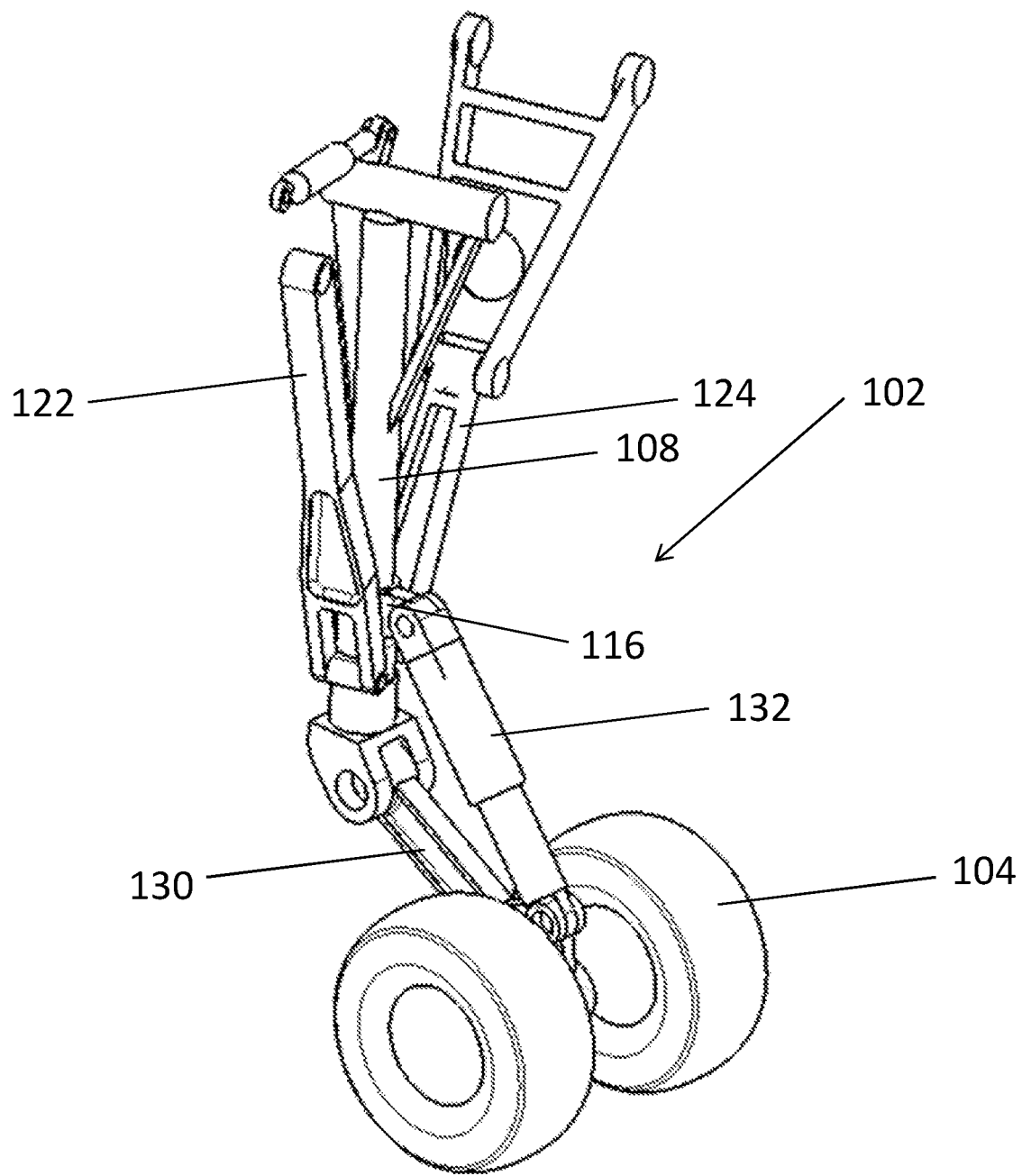
FIG. 6 shows a perspective view of a landing gear in accordance with a second example embodiment of the invention.

FIG. 6 shows a landing gear in accordance with a second example embodiment. Only those aspects of the second embodiment which differ with respect to the first embodiment will be discussed here. Like reference numerals denote like elements. In place of the oleo strut 8 of the first embodiment the landing gear 102 of the third embodiment comprises a single-piece strut 108 connected at its distal end to a trailing linkage 130. The axle 104 is connected to the distal end of the trailing linkage 130. The collar 116 is mounted on the strut 108 as in the first embodiment. A shock absorber 132 is connected at one end to the trailing linkage 130 and at the other end to the collar 116. In use, the shock absorber 132 damps the movement of the trailing linkage 130 relative to the strut 108. The distribution of the vertical loads between the main strut and the inboard and outboard sidestays (transmitted via the shock absorber 132 and collar 116) may be varied during the design process by altering the position at which the shock absorber 132 is connected to the trailing linkage 130 and/or the location of the collar 116 along the length of the strut 108 when the landing gear is deployed.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The landing gear shown above have two-wheel axles, it will be appreciated that landing gear in accordance with the present invention may include a different number of wheels, for example a single wheel, or a larger number of wheels, for example four, six or eight wheels mounted on a bogie.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft including a landing gear comprising
   a main strut, the main strut being connected to a first attachment point located on the aircraft;
   an inboard sidestay inboard of the main strut, the inboard sidestay having a first end connected to the main strut for movement relative to each part of the main strut, the inboard sidestay being connected at a second end to a second attachment point located on the aircraft; and
   an outboard sidestay outboard of the main strut, the outboard sidestay having a first end connected to the main strut for movement relative to each part of the main strut, the outboard sidestay being connected at a second end to a third attachment point located on the aircraft, and
   wherein, in use when the landing gear is in a deployed configuration, the connection between the first end of each of the inboard and outboard sidestays and the main strut allows for movement of each first end along at least a portion of the length of the main strut.

2. An aircraft according to claim 1, wherein the landing gear comprises a collar, the collar being mounted on the main strut for movement along the main strut, and wherein the first end of each of the inboard and outboard sidestays are attached to the collar.

3. An aircraft according to claim 1, wherein the movement of the first end of each of the inboard and outboard sidestays is not locally damped such that the sidestays are effectively isolated from vertical landing gear loads experienced by the main strut.

4. An aircraft according to claim 1, wherein the landing gear comprises one or more dampers configured such that at least a portion of the vertical landing gear loads experienced by the landing gear are transmitted to each sidestay via a damper.

5. An aircraft according to claim 4, wherein a first end of the damper is connected to the collar.

6. An aircraft according to claim 4, wherein the landing gear comprises a trailing linkage and a second end of the damper is connected to the trailing linkage such that vertical landing gear loads are transmitted from the trailing linkage to each of the inboard and outboard sidestays via the damper and the collar.

7. An aircraft according to claim 2, wherein the landing gear comprises a torque link, the torque link being connected at a first end to the main strut and at a second end to the collar such that, in use, when the landing gear is in the deployed configuration, torque loads experienced by the main strut are transferred to the aircraft via the collar and the inboard and outboard sidestays.

8. An aircraft according to claim 1, wherein the landing gear is arranged such that, in use, when the landing gear is in the deployed configuration, drag loads are transferred by the inboard and outboard sidestays for reaction at the second and third attachment points respectively.

9. An aircraft according to claim 1, wherein the landing gear is arranged such that, in use, when the landing gear is the deployed configuration, lateral loads are transferred through the inboard and outboard sidestays for reaction at the second and third attachment points respectively.

10. An aircraft according to claim 1, wherein the first, second and third attachment points are arranged in a straight line.

11. An aircraft according to claim 10, further comprising a structure having a spar, and optionally wherein the spar is a composite spar.

12. An aircraft according to claim 1, wherein each of the inboard sidestay, outboard sidestay and main strut are pivotally connected to the relevant attachment point for rotation about an axis substantially parallel to the longitudinal axis of the aircraft during retraction and/or deployment of the landing gear.

13. An aircraft according to claim 12, wherein the main strut is connected to the first attachment point for rotation about a central point in two orthogonal axes during retraction and/or deployment of the landing gear; the first axis being substantially parallel to the longitudinal axis of the aircraft.

14. An aircraft according to claim 1, wherein the inboard sidestay is of variable length and/or the outboard sidestay is of a fixed length.

15. An aircraft according to according to claim 1, wherein the landing gear is a main landing gear.

16. A landing gear configured for use as the landing gear of claim 1.

17. An aircraft according to claim 1, wherein the aircraft includes a wing and the first, second and third attachment points are located on a structure forming part of the wing.

18. A method of distributing landing gear loads in an aircraft including a landing gear, comprising:
 a main strut, the main strut being connected to a first attachment point located on the aircraft;
 an inboard sidestay inboard of the main strut, the inboard sidestay having a first end connected to the main strut, the inboard sidestay being connected at a second end to a second attachment point located on the aircraft;
 and an outboard sidestay outboard of the main strut, the outboard sidestay having a first end connected to the main strut, the outboard sidestay being connected at a second end to a third attachment point located on the aircraft,
 wherein, in use when the landing gear is in the deployed configuration, the connection of the first end of each of the inboard and outboard sidestays allows for movement of the first end vertically relative to each part of the main strut.

19. A method accordingly to claim 18, wherein the first end of each of the inboard and outboard sidestays slides up the main strut as the landing gear is retracted.

20. A method of retracting an aircraft landing gear, comprising:
 a main strut, the main strut being connected to a first attachment point located on an aircraft;
 an inboard sidestay inboard of the main strut, the inboard sidestay being connected at a first end to the main strut and at a second end to a second attachment point located on the aircraft; and
 an outboard sidestay outboard of the main strut, the outboard sidestay being connected at a first end to the main strut and at a second end to a third attachment point located on the aircraft, the method comprising the steps of rotating the main strut about an axis substantially parallel to the longitudinal axis of the aircraft; and
 wherein the first end of each of the inboard and outboard sidestays slides up relative to each part of the main strut as the strut rotates.

21. A method according to claim 20, wherein the length of the inboard sidestay reduces as the landing gear retracts.

* * * * *